March 24, 1936.　　　　G. E. CARLE　　　　2,035,044
SAFETY DEVICE FOR CRANES
Filed July 16, 1934　　　2 Sheets-Sheet 1

Inventor
G. E. Carle.

By Lacey & Lacey,
Attorneys

March 24, 1936.                G. E. CARLE                2,035,044
                        SAFETY DEVICE FOR CRANES
                          Filed July 16, 1934          2 Sheets-Sheet 2
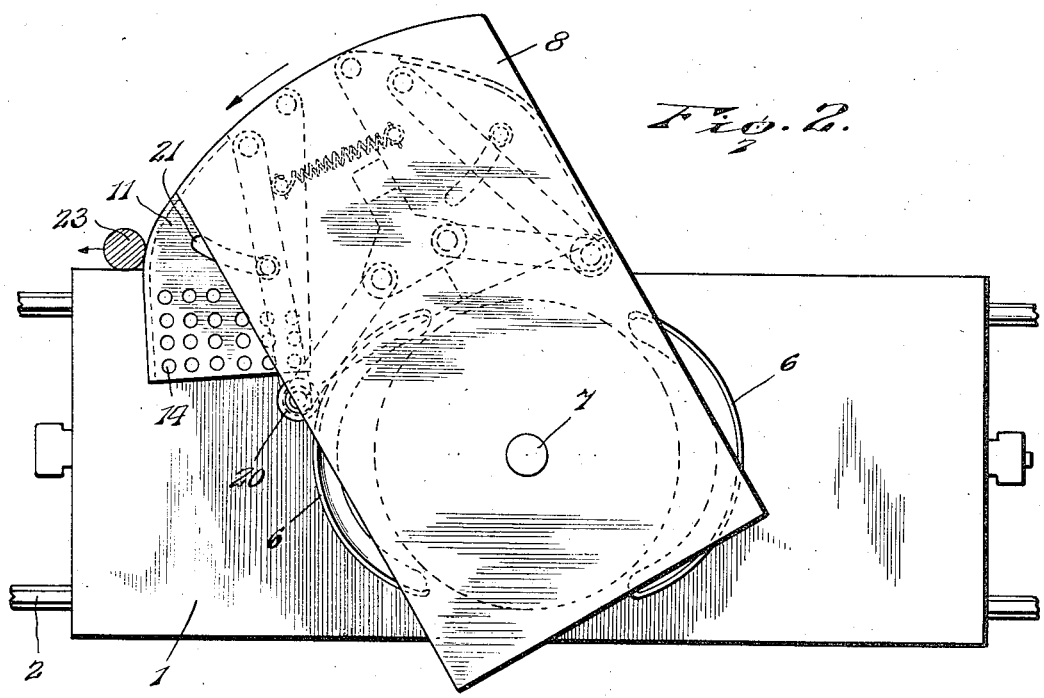
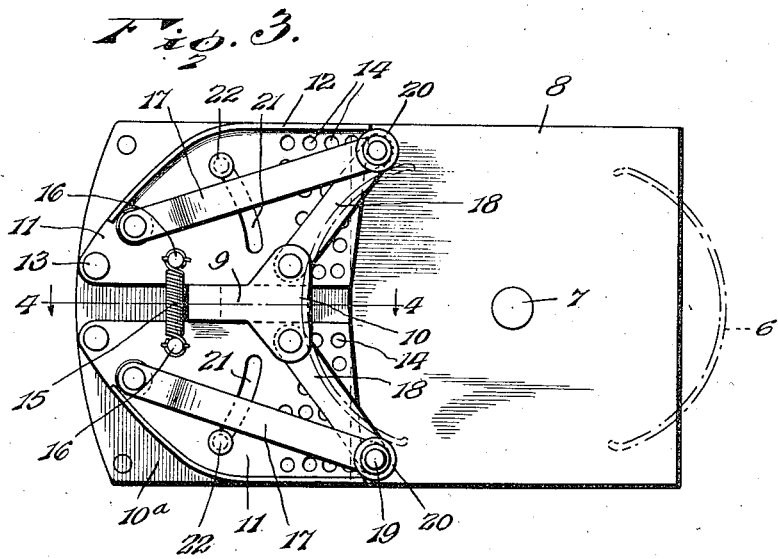
Inventor
G. E. Carle.
By Lacey & Lacey,
                 Attorneys Patented Mar. 24, 1936

2,035,044

UNITED STATES PATENT OFFICE 2,035,044

SAFETY DEVICE FOR CRANES

George E. Carle, Brilliant, Ohio

Application July 16, 1934, Serial No. 735,486

9 Claims. (Cl. 212—70)

This invention relates to that type of heavy machinery known as locomotive cranes and has for its object the provision of means which will be operated by the turning of the cabin to remove from the path of the cabin any person or object therein so that injury and loss of life will be averted. The invention is illustrated in the accompanying drawings and consists in certain novel features which will be hereinafter first fully described and then more particularly defined in the claims.

In the drawings:

Figure 1 is a side elevation of a crane embodying the present invention.

Figure 2 is a plan view on a larger scale with the cabin removed and showing the invention in its operative position.

Figure 3 is a bottom plan view of the floor of the cabin with the safety device withdrawn into inoperative position.

Figure 1:
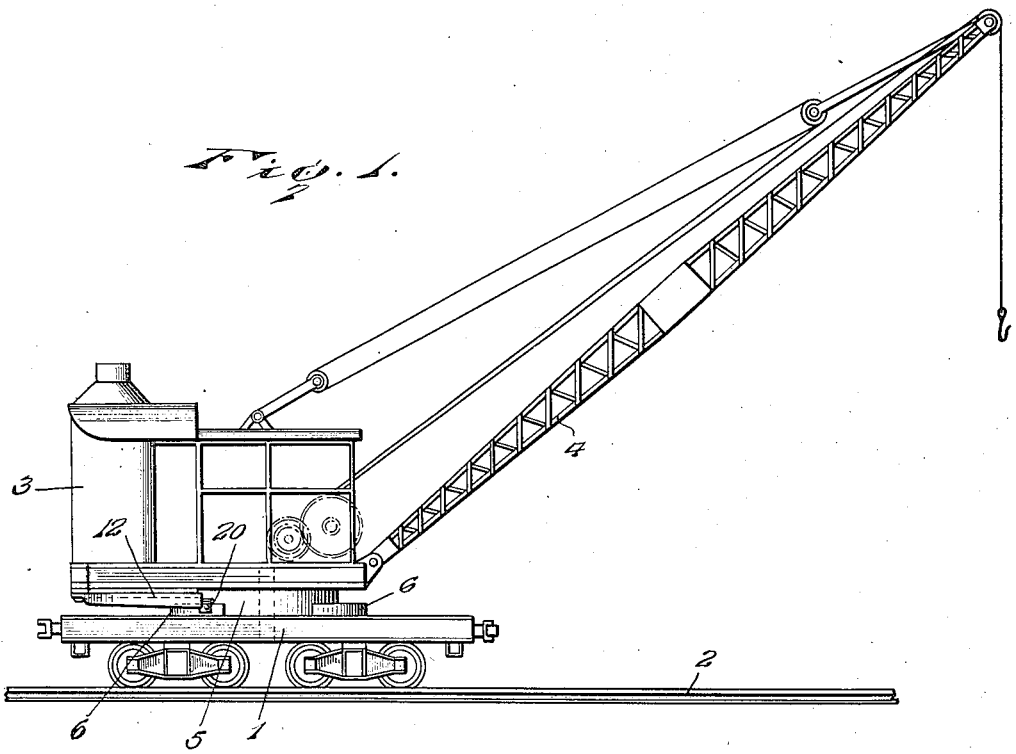

Locomotive cranes embody a truck 1 which is adapted to run upon rails 2 and be drawn by a locomotive or through being coupled to a train or by other analogous means. Upon the truck is supported a cabin 3 which houses the engine and operating machinery and from which extends a boom 4. The cabin is usually secured upon a turn table 5 and properly centered thereon by a king bolt 7 which is fixed in the truck.

Figure 4:
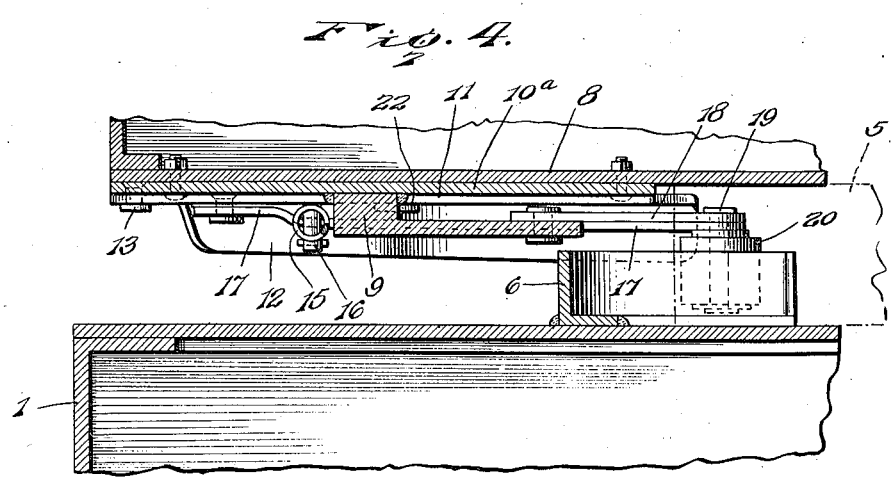
Figure 4 is an enlarged vertical section on the line 4—4 of Figure 3.

In carrying out the present invention there is provided at each side of the turn table, on the upper side of the truck 1, an eccentric flange or rib 6 and on the underside of the floor of the cabin are mounted pushers and means connected with the pushers to be actuated by the eccentrics to project the pushers beyond the cabin floor or withdraw them within the lines of the floor as the cabin and its floor turn about the king bolt. Secured to the cabin floor, shown at 8, on the medial longitudinal line thereof is a bracket 9 which is formed at its inner end, or that end nearer the eccentric, with a Y-head 10, the bracket being spaced from the floor, as clearly shown in Figure 4. Between the head and the outer end which is secured to the floor, a metallic wear plate or sheathing 10ª is secured to the underside of the floor so as to reinforce the floor and guard against splitting of the same which would tend to loosen the pushers and the operating parts. Disposed at each side of the bracket 9 is a pusher consisting of a metallic plate 11 having a depending flange 12 along its outer edge. The pusher plate has a straight edge which is adapted to bear against the outer end of the bracket 9, as shown in Figure 3, when it is withdrawn, and when in this position the flange 12 will be flush with the side edge of the cabin floor. The pusher plate tapers outwardly and at the corner or point of convergence of the inner and outer edges a pivot bolt 13 is inserted through the plate and secured to the floor of the cabin whereby the pusher plate may swing inwardly or outwardly in the operation of the device. The inner or rear end of the plate is preferably formed at nearly a right angle to the inner side edge of the plate and in the inner end portion of the plate a plurality of openings 14 are formed to permit the discharge of dirt which might otherwise collect upon the plates and tend to prevent their successful operation, as well as to lessen the weight of the plates without affecting their efficiency. The plates are normally held retracted and against the sides of the bracket 9 by a contractile spring 15 which is disposed transversely of the cabin floor and has its ends fitted upon studs 16 mounted in and depending from the respective plates. Pivoted to the pusher plate adjacent the pivotal point of the same is a link 17 which extends rearwardly and outwardly and has its inner or rear end pivoted to a second link 18 which extends inwardly and has its opposite end pivoted to the end of the Y-head 10 of the bracket 9. The pivot bolt 19, which connects the ends of the links 17 and 18, carries a roller 20 which is adapted to ride upon the adjacent eccentric rib 6 and thereby cause an inward and outward movement of the pushers as the cabin turns. In each plate is an arcuate slot 21 having the pivot of the plate as its center and a guide stud 22, depending from the floor of the cabin, passes through this slot so as to aid in supporting the pusher plate and also limiting the pivotal movement of the same.

Upon referring to Figure 2, it will be understood that as the cabin turns in the direction indicated by the arrow its leading edge or side moves toward the side or edge of the truck so that these two elements form, in effect, a gigantic shears which are apt to crush or sever any object or person which may be caught within the triangular area defined by these elements. At 23 in Figure 2 I have indicated an object in such relation to the truck in order that the operation of the safety device may be readily understood. As the truck turns, as indicated in Figure 2, the leading roller 20 will be brought into engagement with the adjacent cam or eccentric 6 and will be thereby caused to move outwardly beyond the edge or side of the cabin and this action will be transmitted to the link 17 which will thereupon cause the connected pusher plate 11 to swing about its pivot and project beyond the side of the cabin, as shown by the full lines in Figure 2. This pusher plate will impinge against the object or person who may be adjacent the side of the truck and will exercise a gentle force to shove or push the person or object out of the range of the cabin. As the turning movement of the cabin proceeds, the roller will reach the low point of the eccentric 6 and the spring 15 will retract the pusher plate. Upon referring to Figure 3, it will be noted that in the retracted inoperative position of the pushers all the mechanism is disposed between the lines of the cabin so that they will not be apt to be damaged by contact with adjacent objects. As the eccentric ribs or flanges 6 are disposed on opposite sides of the pivot bolt 7 and centered relative to the opposite side edges of the truck, it follows that the pusher elements will be moved to operative position at either side of the truck according to the movement of the cabin.

Many serious accidents have been due to the presence of persons or objects adjacent the truck when the cabin turns and many persons have been killed instantly by the scissors-like action of the cabin and truck. When the cabin is equipped with my safety device all of these accidents will be eliminated inasmuch as the pusher plate will exert its force substantially in a line parallel with the edge or side of the truck and will act in advance of the approach of the side of the cabin to the truck. The mechanism is simple and compact and is not apt to get out of order and may be installed upon any crane at a low cost.

Having thus described my invention, what is claimed as new is:

1. A safety attachment for cranes which include a truck and a cabin mounted to turn thereon, said safety device comprising pushers pivotally mounted on the bottom of the cabin and movable therewith to either side of the truck, resilient means for retaining the pushers retracted, and cooperating means carried by the pushers and cabin and operable by the turning of the cabin to project one of the pushers laterally at either side of the truck into the area between the side of the truck and the side of the cabin while the other pusher remains retracted.

2. In a crane comprising a truck and a cabin mounted on the truck to turn laterally thereon, a safety device comprising eccentrics mounted at opposite sides of the pivotal connection between the cabin and the truck, said eccentrics being fixed on the truck, pushers pivotally mounted on the bottom of the cabin, resilient means for normally holding the pushers retracted within the side lines of the cabin, and lever mechanism connected with the pushers and having portions arranged for engagement with the eccentrics as the cabin turns to cause the pushers to be individually projected beyond sides of the cabin according to the direction in which the cabin turns while the other pusher remains retracted.

3. A safety mechanism for locomotive cranes comprising pushers, means for pivotally mounting the pushers upon the bottom of the cabin of the crane, eccentrics fixed upon the truck of the crane, links each pivoted at one end at a fixed point on the cabin between the pushers and having its other end arranged to ride upon a cooperating eccentric as the cabin turns, other links pivoted to the free ends of the first links and extending therefrom and pivotally connected with the adjacent pushers, resilient means for normally holding the pushers retracted, and means carried by the links for individually engaging the eccentrics during turning of the cabin to cause one of the pushers to be projected beyond a side of the cabin as the cabin turns while the other pusher remains retracted.

4. A safety mechanism for locomotive cranes comprising a bracket secured upon the bottom of the cabin of the crane, pushers pivoted to the bottom of the cabin adjacent the end of the same, yieldable means for holding the pushers normally retracted against the bracket, links pivoted at their outer ends to the pushers, other links pivoted to the bracket and having their outer ends pivoted to the inner ends of the first-mentioned links, and eccentrics fixed upon the truck to act upon the connected ends of the links whereby to project the pushers beyond the sides of the cabin as the cabin turns in one or the opposite direction.

5. A safety mechanism for locomotive cranes including eccentric tracks fixed upon the truck of the crane, a bracket secured to the bottom of the cabin of the crane, pusher plates pivotally mounted adjacent the end of the cabin, yieldable means for holding the pusher plates normally retracted and against the sides of the bracket, arcuate guide slots in the pushers, studs depending from the cabin through said slots to limit the movement of the pushers, links pivoted at their outer ends to the pushers near the pivotal points of the same and extending inwardly therefrom, other links pivotally attached to the bracket and having their free ends pivoted to the free ends of the first links, and rollers carried by the pivoted ends of the links to run upon the eccentric tracks.

6. The combination with a truck having a cabin mounted for turning movement thereon, of a safety device carried by and movable with the cabin and including coacting pivotally mounted pushing elements having substantially arcuate outer edges, resilient means connecting the pushing elements for normally holding them in position, and cooperating means carried by the truck and pushing elements and operable by turning of the cabin for individually projecting one pushing element laterally from a side of the truck against tension of the resilient means according to the direction in which the cabin turns while the other pushing element remains retracted.

7. The combination with a truck having a cabin mounted for turning movement thereon, of a safety device carried by and movable with the cabin and including coacting pushing elements and resilient means yieldably holding the pushing elements housed beneath the cabin, and cam means mounted on the truck in position for engaging said pushing elements and projecting one pushing element laterally beyond a side edge of the truck during and in accordance with directional turning movement of the cabin while the other pushing element remains housed beneath said cabin.

8. The combination with a truck having a cabin mounted for turning movement thereon, of a safety device including pushing elements carried by and movable with the cabin, spring means for normally holding said pushing elements in retracted position beneath said cabin, and cam means mounted on the truck for engaging said pushing elements and projecting a pushing element against the resiliency of the spring means laterally from the adjacent side of the cabin at either side of the truck during and in accordance with directional turning movement of the cabin.

9. The combination with a truck having a cabin mounted for turning movement thereon, of a safety device including pushing elements carried by and movable with the cabin, eccentrics mounted on the truck on opposite sides of the pivotal axis of the cabin in eccentric relation thereto and centered with respect to the opposite longitudinal edges of the truck, resilient means for normally holding the pushing elements retracted, actuating means carried by the pushing elements and adapted to engage one of the eccentrics according to the direction in which the cabin turns for projecting one pushing element laterally at either side of the truck during the turning movement of the cabin while the other pushing element remains retracted.

GEORGE E. CARLE.